United States Patent
Lin

(10) Patent No.: US 7,318,221 B2
(45) Date of Patent: Jan. 8, 2008

(54) WINDOWS™ F-LANGUAGE INTERPRETER

(75) Inventor: Su-Chen Lin, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 934 days.

(21) Appl. No.: 10/604,456

(22) Filed: Jul. 22, 2003

(65) Prior Publication Data
US 2004/0177350 A1 Sep. 9, 2004

(30) Foreign Application Priority Data
Mar. 7, 2003 (TW) .............................. 92105018 A

(51) Int. Cl.
G06F 9/45 (2006.01)
(52) U.S. Cl. ....................... 717/143; 717/139; 717/142
(58) Field of Classification Search ................. 717/139
See application file for complete search history.

(56) References Cited
U.S. PATENT DOCUMENTS
6,715,141 B1 * 3/2004 Hodge ........................ 717/139

2003/0217352 A1 * 11/2003 Ueno et al. ................. 717/115

OTHER PUBLICATIONS

A Scalable Architectecture for Multi-threaded JAVA Applications. Michael Mrva, Klaus Buchenrieder, Rainer Kress. IEEE, Jul. 1998, pp. 868-874.*
DynaScript Technologies brochure. http://www.dynascript.com/index.html, 2 pages.*

* cited by examiner

Primary Examiner—Chuck Kendall
(74) Attorney, Agent, or Firm—Winston Hsu

(57) ABSTRACT

A computer system includes a memory and a processor. The memory includes an interpreter for interpreting data in a multiple task system. The interpreter includes a scanner for reading at least one command from an input port and providing a token according to the category of the command, a first parser for interpreting the command when the token indicates the first parser, and a second parser for interpreting the command when the token indicates the second parser, for temporarily storing data generated after interpreting the command into a message center in the memory, and for executing the data stored in the message center after interpreting all other corresponding commands. The processor is for processing programs and data stored in the memory.

18 Claims, 3 Drawing Sheets

WINDOWS™ F-LANGUAGE INTERPRETER

BACKGROUND OF INVENTION

1. Field of the Invention

The present invention relates to an interpreter, and more specifically, to a Windows™ F-language interpreter.

2. Description of the Prior Art

While executing a high level language, two types of methods are available: a compiler program can convert source code into machine code that can be directly executed, or an interpreter program can translate source code while execution takes place. Six steps are required to execute a program including: lexical analysis, syntactic analysis, semantic analysis, intermediate code generating, optimizing, and object code generating. However, an interpreter does not need to compile the source codes at first, but instead only processes the six steps while executing the source codes. Most test programs are written for F language interpreters in DOS (disk operating system) version and these programs can only be executed in a single task environment.

Please refer to FIG. 1. FIG. 1 is a block diagram illustrating an F language interpreter 10 according to the prior art. The F language interpreter 10 utilizes a parser 12 to interpret a command input by a user in a command line. After the user inputs a command and presses the enter key, the command will be directly executed after parsed by the parser 12 of the F language interpreter 10. When utilizing the F language interpreter 10 to execute a program, the user must input commands one by one in the command line, and press the enter key every time after inputting one command in order to execute the command. The F language interpreter 10 parses and executes the commands input by user one by one by the parser 12, so that user can utilize the F language interpreter 10 to test the software and hardware of a computer system. For example, the F language interpreter 10 can be used to test whether the fan of a central processing unit (CPU) is in operation, whether a memory is correctly accessed, whether a light on a motherboard lights up, or whether a program installed in the computer system is in operation etc. Since DOS is a single task environment where only one command can be executed at a time, the F language interpreter 10 is developed on the basis of DOS and can only simulate a single task environment to execute a test program.

As mentioned above, the DOS F language interpreter 10 simulates a single task testing environment, but most of the modern operating systems apply a multiple task Windows™ system. Under this condition, the single task environment provided by the DOS F language interpreter 10 is unable to fulfill practical requirements. In the single task environment, programs are executed one after another, and unlimitedly utilize system resources, such as CPU, memory and input/output (I/O) etc. Programs may even occupy the computer system from the control side of the operating system. But in the multiple task environment, simultaneous execution of a plurality of programs is allowed so that system resources such as CPU and memory are shared. Therefore resources management is necessary to prevent the simultaneously executed programs from interfering with each other, in order to ensure the programs are fully executed. Moreover, the commands of the F language interpreter 10 are input one by one, which is convenient for users to execute single tests, but ineffective for system integration testing. Additionally, when the F language interpreter 10 interprets a test program, if the test program includes an I/O operation, the user needs to write a far more complicated command sequence in order to execute the I/O operation, which causes further difficulties testing.

SUMMARY OF INVENTION

It is therefore a primary objective of the present invention to provide a Windows™ F language interpreter to solve the above-mentioned problems.

Briefly summarized, a computer system according to the present invention includes a memory and a processor. The memory includes an interpreter for interpreting data in a multiple task system. The interpreter includes a scanner for reading at least one command from an input port and providing a token according to the category of the command, a first parser for interpreting the command when the token indicates the first parser, and a second parser for interpreting the command when the token indicates the second parser, for temporarily storing data generated after interpreting the command into a message center in the memory, and for executing the data stored in the message center after interpreting all other corresponding commands. The processor is for processing programs and data stored in the memory.

The present invention also provides a method for executing an interpreter code in a multiple task system in a computer system. The computer system includes a memory and a processor. The memory includes a scanner, a first parser and a second parser. The method includes (a) reading at least one command from an input port by the scanner and providing a token according to the category of the command, (b) interpreting the command by the first parser when the token indicates the first parser, (c) storing the second parser into the memory, (d) interpreting the command by the second parser when the token indicates to the second parser code, temporarily storing data generated after interpreting the command into a message center in the memory, and executing the data stored in the message center after interpreting all other corresponding commands.

These and other objectives of the present invention can be easily understood after reading the following detailed description of the preferred embodiment that is illustrated in the various figures and drawings.

DETAILED DESCRIPTION

Figure 1:
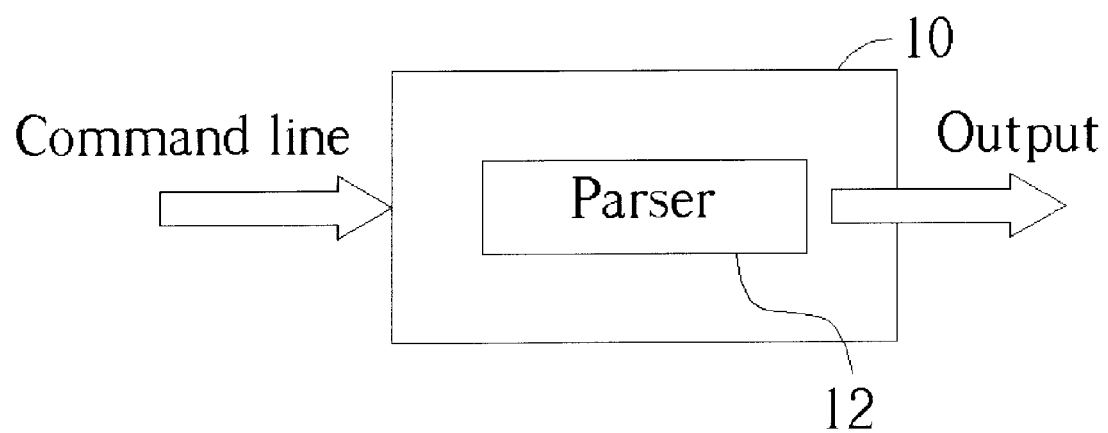
FIG. 1 is a block diagram illustrating an F language interpreter according to the prior art.
Figure 2:
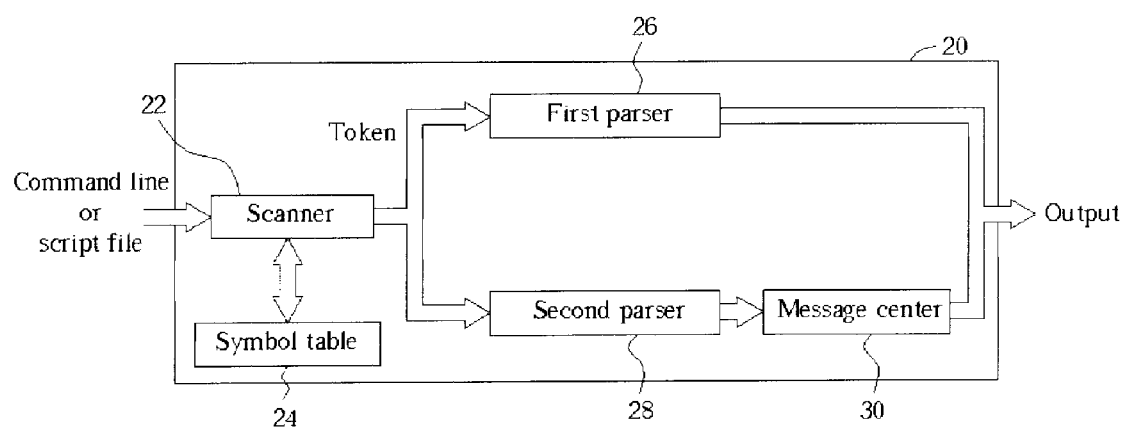
FIG. 2 is a block diagram illustrating the structure of the Windows™ F language interpreter according to the present invention.

Please refer to FIG. 2. FIG. 2 is a block diagram illustrating the structure of a Windows™ F language interpreter 20 according to the present invention. The Windows™ F language interpreter 20 includes a scanner 22, a symbol table 24, a first parser 26, a second parser 28 and a message center 30. The Windows™ F language interpreter 20 is executed in a Windows™ system, and the Windows™ system is installed in a computer system. The computer system includes a CPU and a memory for processing and storing programs and data of the Windows™ system. The Windows™ F language interpreter 20 includes two input modes.

The first mode is a console mode for inputting one line commands, and the second mode is a script mode for reading a test program stored in a script file. The scanner 22 is used to read the commands to provide a token for each command according to its category, in order to determine whether the command is going to be processed by the first parser 26 or the second parser 28. If the command includes symbols unrecognizable to the scanner 22, the scanner 22 searches for corresponding commands in the symbol table 24. All of the commands can be divided into two categories. The first category is for common commands referred to as application-level commands, including mathematical operations, stack operations, logical operation and printer commands. The second category is for special commands referred to as driver-level commands, which includes I/O actions, memory access, and call interruptions. The first parser 26 is used to interpret the application-level commands. No I/O action exists for the application-level commands, therefore the commands can be executed directly after interpretation, and the result is output to a file. The second parser 28 is used to interpret the driver-level commands. Since the driver-level commands include I/O actions and all of the I/O actions are processed by drivers in Windows ™, the second parser 28 takes part of the memory in the message center 30 to temporarily store the interpreted commands, and executes the commands stored in the message center 30 after the driver finishes processing the I/O actions. The result is then output to the file.

Figure 3:
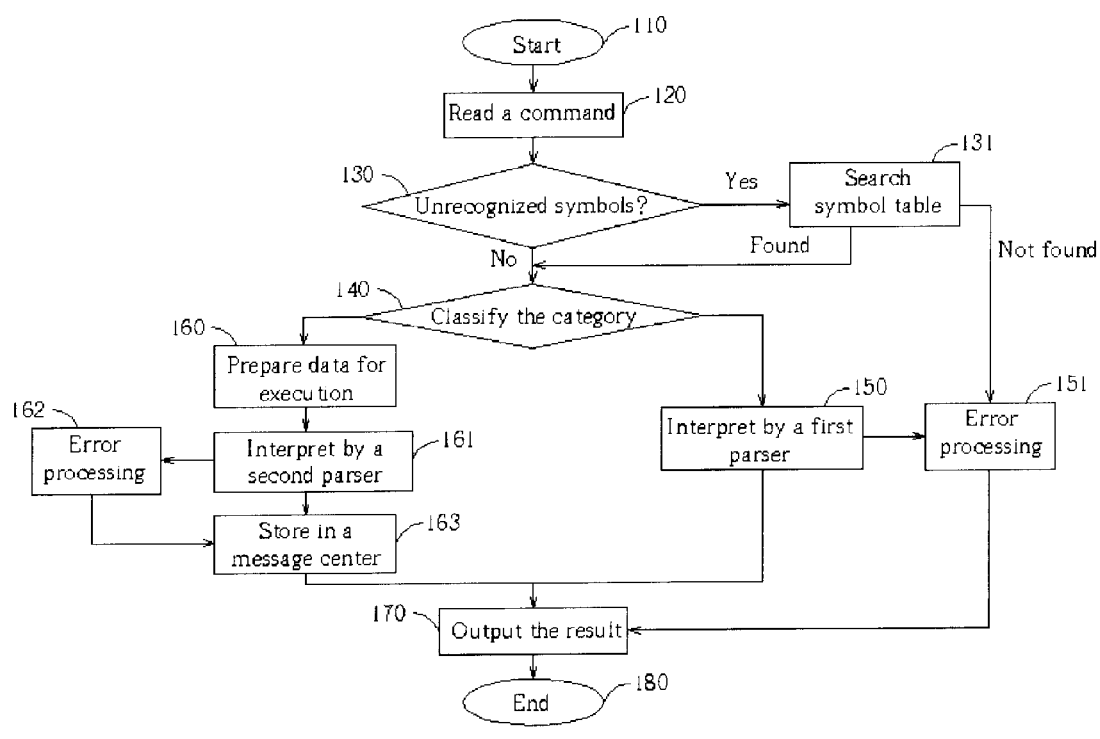
FIG. 3 is a flow chart illustrating the execution of the Windows™ F language interpreter according to the present invention.

Please refer to FIG. 3. FIG. 3 is a flow chart illustrating the execution of the Windows™ F language interpreter 20 according to the present invention. When the Windows™ F language interpreter 20 is executed, the scanner 22 reads a command from a command line or a script file. If the command includes symbols unrecognizable to the scanner 22, the scanner 22 searches for corresponding commands in the symbol table 24. If the corresponding commands are not found, a lexical error occurs, which means that the command is not defined by the Windows™ F language interpreter 20 or misspelled. In this situation, the command is regarded as invalid and an error is generated. An error message is displayed in a file and the interpretation ends. After reading a correct command, the scanner 22 provides a token for the command according to its category. An application-level command is processed by the first parser 26, and a driver-level command is processed by the second parser 28. The command parsed by the first parser 26 is executed directly and the result is output to a file. If a syntax error occurs during interpretation, the first parser 26 generates an error for the command, outputs an error message to a file, and the Windows™ F language interpreter 20 finishes interpreting the command and continues to interpret a next command. When a command is classified to be a driver-level command, a driver is called to prepare data necessary for executing the command, and then the second parser 28 interprets the command and stores it in the message center 30. If a syntax error occurs during interpretation, the second parser 28 generates an error for the command, stores an error message into the message center 30, executes the data stored in the message center 30, and outputs the result to the file after interpretation of corresponding commands. Detailed steps are described as follows.

Step 110: Start interpreting commands, proceed to Step 120;

Step 120: Read a command from a command line or a script file by the scanner, proceed to Step 130;

Step 130: Check whether the command includes unrecognized symbols by the scanner. If the command includes unrecognized symbols proceed to Step 131, if no proceed to Step 140;

Step 131: Search for corresponding commands of the unrecognized symbols according to a symbol table, if found proceed to Step 140. If no corresponding command exists, proceed to Step 151 to process a lexical error;

Step 140: Classify the category of the command by the scanner. If the command is an application-level command, proceed to Step 150. If the command is a driver-level command, proceed to Step 160;

Step 150: Interpret the command by a first parser. If the command can be interpreted correctly, proceed Step 170. If the command includes a syntax error, proceed to Step 151;

Step 151: Process the error to the command and output an error message, proceed to Step to 170;

Step 160: Call a driver to prepare data necessary for executing the command, proceed to Step 161;

Step 161: Interpret the command by a second parser. If the command can be interpreted correctly, proceed to Step 163. If the command includes a syntax error, proceed to Step 162;

Step 162: Process the error to the command and output an error message, proceed to Step 163;

Step 163: Store the interpreted command in a message center, proceed to Step 170 after interpretation is finished;

Step 170: Execute the interpreted command and output the result to a file, proceed to Step 180;

Step 180: End the interpretation of the command and prepare for the next command.

As described above, the Windows™ F language interpreter 20 not only provides a debug mode including a command line for inputting one line commands, but also reads the commands written in script files, so that users can develop test programs more easily. Moreover, the Windows™ F language interpreter 20 provides a method to write commands corresponding to input and output functions directly in the Windows™ system, so that not only the time necessary for writing a driver program corresponding to I/O devices is reduced, but also the difficulties of developing test programs is decreased.

In contrast to the prior art, the Windows™ F language interpreter according to the present invention provides an environment for test programs to be executed in Windows™ system. Because the test programs written with DOS F language interpreter can only be executed in a single task environment, for a multiple task environment, the results made by the conventional test programs are not accurate. The test programs written with the Windows™ F language interpreter according to the present invention provide a simulation environment closer to reality for devices to be tested, so that an accurate result is available. Furthermore, the test programs already written for the DOS F language interpreter can be directly transplanted into the Windows™ system to reduce the time for developing test programs, improve the accuracy of the result, and ensure the stability of the devices to be tested.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer system comprising:
   a memory comprising:
     a message center;

an interpreter for interpreting data in a multiple task system, the interpreter comprising:
: a scanner for reading at least one command from an input port and providing a token according to the category of the command;
: a first parser for interpreting the command when the token indicates the first parser; and
: a second parser for interpreting the command when the token indicates the second parser, for temporarily storing data generated after interpreting the command into the message center in the memory, and for executing the data stored in the message center after interpreting all other corresponding commands; and
: a processor for processing programs and data stored in the memory;

wherein the scanner is for providing the token indicating the first parser for application-level commands, and is for providing the token indicating the second parser for driver-level commands.

2. The computer system of claim 1 wherein the interpreter further comprises a symbol table for providing a mapping of commands and symbols, in order to convert symbols input at the input port into commands.

3. The computer system of claim 1 wherein the input port is a command line or a script file.

4. The computer system of claim 1 wherein the first parser and the second parser can output data generated after interpreting the command by the first parser and the second parser to an output port.

5. The computer system of claim 4 wherein the output port is a file stored in the memory.

6. The computer system of claim 1 wherein the command(s) read by the scanner belong to an F-language.

7. The computer system of claim 1 wherein the application-level commands include mathematical operations, stack operations, logical operations, and printer commands.

8. The computer system of claim 1 wherein the driver-level commands include input output I/O actions, memory access, and call interruptions.

9. The computer system of claim 1 wherein the driver-level commands are commands requiring processing from drivers provided by an operating system of the multiple task system.

10. A method for executing an interpreter code in a multiple task system in a computer system, wherein the computer system comprising a memory and a processor, the memory comprising a scanner, a first parser, and a message center, the method comprising:
: reading at least one command from an input port by the scanner and providing a token according to the category of the command;
: interpreting the command by the first parser when the token indicates the first parser;
: storing a second parser into the memory;
: interpreting the command by the second parser when the token indicates the second parser, temporarily storing data generated after interpreting the command into the message center in the memory, and executing the data stored in the message center after interpreting all other corresponding commands; and
: providing the token indicating the first parser for application-level commands, and providing the token indicating the second parser for driver-level commands.

11. The method of claim 10 wherein the scanner converts symbols inputted at the input port into commands according to a symbol table.

12. The method of claim 10 wherein the input port is a command line or a script file.

13. The method of claim 10 wherein the first parser and the second parser can output data generated after interpreting the command by the first parser and the second parser to an output port.

14. The method of claim 13 wherein the output port is a file stored in the memory.

15. The method of claim 10 for executing the interpreter code being of an F-language.

16. The method of claim 10 wherein the application-level commands include mathematical operations, stack operations, logical operations, and printer commands.

17. The method of claim 10 wherein the driver-level commands include input output I/O actions, memory access, and call interruptions.

18. The method of claim 10 wherein the driver-level commands are commands requiring processing from drivers provided by an operating system of the multiple task system.

* * * * *